US008792772B2

(12) United States Patent
Sakai et al.

(10) Patent No.: US 8,792,772 B2
(45) Date of Patent: Jul. 29, 2014

(54) PLAYBACK CONTROL DEVICE, METHOD AND PROGRAM

(75) Inventors: Shinji Sakai, Kanagawa (JP); Arito Kobayashi, Kanagawa (JP)

(73) Assignee: Sony Corporation, Tokyo (JP)

(*) Notice: Subject to any disclaimer, the term of this patent is extended or adjusted under 35 U.S.C. 154(b) by 1141 days.

(21) Appl. No.: 12/011,612

(22) Filed: Jan. 28, 2008

(65) Prior Publication Data

US 2008/0181580 A1 Jul. 31, 2008

(30) Foreign Application Priority Data

Jan. 30, 2007 (JP) ................. P2007-019575

(51) Int. Cl.
*H04N 7/26* (2006.01)
*H04N 5/91* (2006.01)

(52) U.S. Cl.
USPC ........... 386/248; 386/220; 386/230; 715/721; 715/732

(58) Field of Classification Search
USPC ............ 348/14.12, 24, 333.01, 333.05; 386/200, 218, 219, 220, 230, 248; 715/700, 704, 721, 732
See application file for complete search history.

(56) References Cited

U.S. PATENT DOCUMENTS

| 5,687,160 | A | * | 11/1997 | Aotake et al. | 369/275.3 |
|---|---|---|---|---|---|
| 6,456,777 | B1 | * | 9/2002 | Masuno et al. | 386/243 |
| 6,763,182 | B1 | * | 7/2004 | Endo et al. | 386/224 |
| 6,851,091 | B1 | * | 2/2005 | Honda et al. | 715/721 |
| 7,412,155 | B2 | * | 8/2008 | Kasai | 386/248 |
| 2002/0005845 | A1 | * | 1/2002 | Kondo et al. | 345/204 |
| 2002/0154226 | A1 | * | 10/2002 | Gohda | 348/231.3 |
| 2003/0011608 | A1 | * | 1/2003 | Wada | 345/581 |
| 2003/0110320 | A1 | * | 6/2003 | Ono et al. | 710/1 |
| 2003/0154185 | A1 | * | 8/2003 | Suzuki et al. | 707/1 |
| 2004/0105657 | A1 | * | 6/2004 | Hossain | 386/52 |
| 2004/0169742 | A1 | * | 9/2004 | Shibutani et al. | 348/231.5 |
| 2005/0283804 | A1 | * | 12/2005 | Sakata et al. | 725/52 |
| 2006/0050140 | A1 | * | 3/2006 | Shin et al. | 348/14.02 |
| 2006/0120692 | A1 | * | 6/2006 | Fukuta | 386/95 |
| 2006/0132636 | A1 | * | 6/2006 | Miyata | 348/333.01 |
| 2006/0192881 | A1 | * | 8/2006 | Sato et al. | 348/333.05 |
| 2006/0230345 | A1 | * | 10/2006 | Weng et al. | 715/523 |
| 2006/0256223 | A1 | * | 11/2006 | Lee | 348/333.01 |
| 2007/0031115 | A1 | * | 2/2007 | Oshikiri et al. | 386/95 |
| 2007/0106675 | A1 | * | 5/2007 | Watanabe et al. | 707/10 |
| 2007/0160345 | A1 | * | 7/2007 | Sakai et al. | 386/95 |
| 2007/0201837 | A1 | * | 8/2007 | Meguro et al. | 386/96 |

FOREIGN PATENT DOCUMENTS

| JP | 2002-209190 | 7/2002 |
|---|---|---|
| JP | 2003-309790 | 10/2003 |
| JP | 2006 323621 | 11/2006 |

\* cited by examiner

*Primary Examiner* — David Garcia Cervetti
*Assistant Examiner* — Shanto M Abedin
(74) *Attorney, Agent, or Firm* — Frommer Lawrence & Haug LLP; William S. Frommer; Ellen Marcie Emas

(57) ABSTRACT

A playback control device includes a selection means for selecting a moving picture of a moving picture file having a file name satisfying prescribed conditions or a moving picture of a moving picture file having a prescribed file format and a still picture in still pictures and moving pictures, and a playback control means for controlling playback of the still pictures and the moving pictures so that still pictures and the moving pictures selected by the selection means are played back sequentially in the prescribed order.

9 Claims, 8 Drawing Sheets

FIG. 3

| KEY OPERATION | PHOTO-MOVING PICTURE | VIDEO-MOVING PICTURE |
|---|---|---|
| UPPER BUTTON | PLAY BACK PREVIOUS CONTENT | 30 SECONDS SKIP |
| LOWER BUTTON | PLAY BACK NEXT CONTENT | -15 SECONDS |
| LEFT BUTTON | FAST REWIND | FAST REWIND |
| RIGHT BUTTON | FAST FORWARD | FAST FORWARD |
| PREVIOUS BUTTON | PLAY BACK PREVIOUS CONTENT | CHAPTER REWIND |
| NEXT BUTTON | PLAY BACK NEXT CONTENT | CHAPTER FORWARD |
| EOF | PLAY BACK NEXT CONTENT | PAUSE AT THE END |

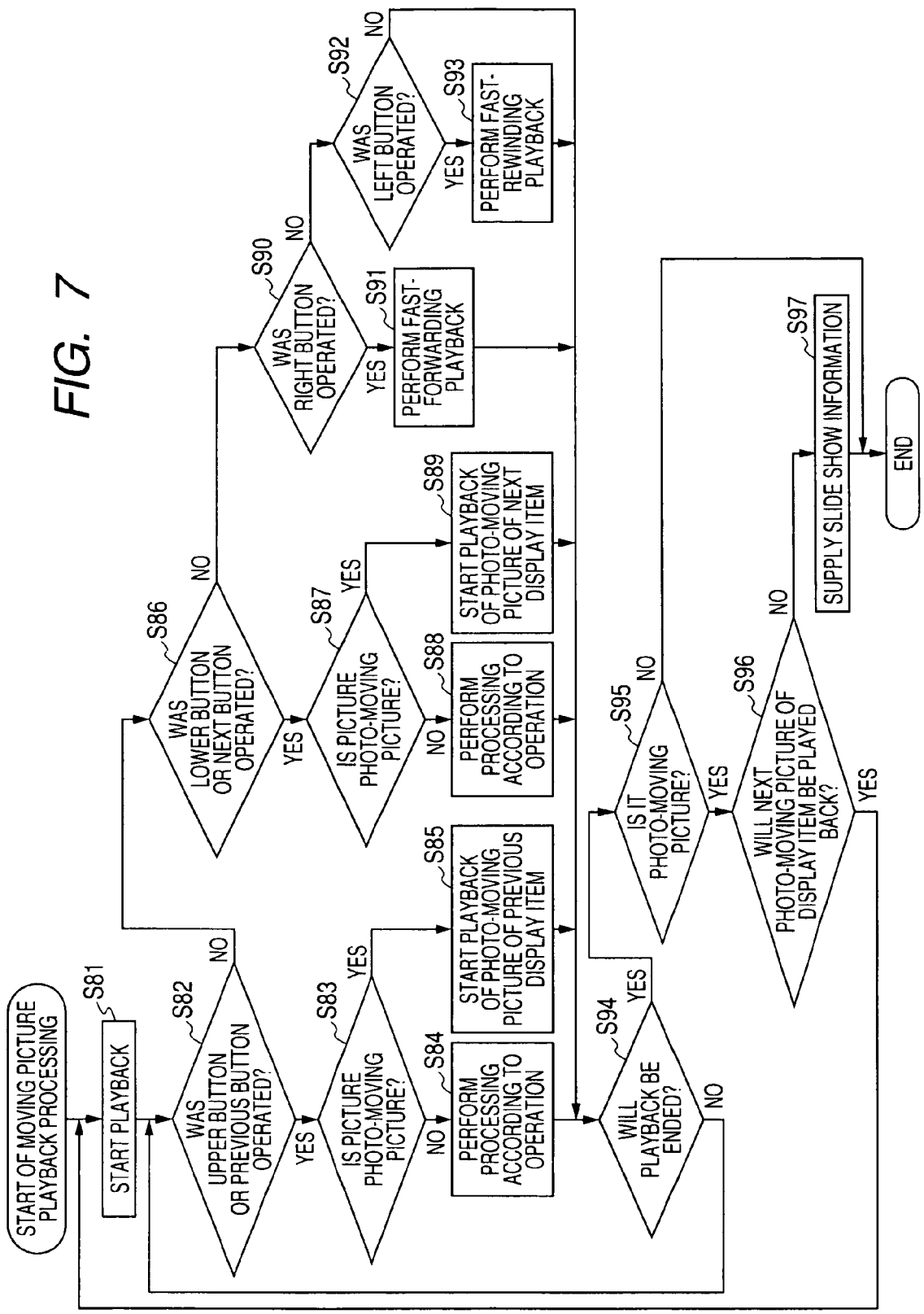

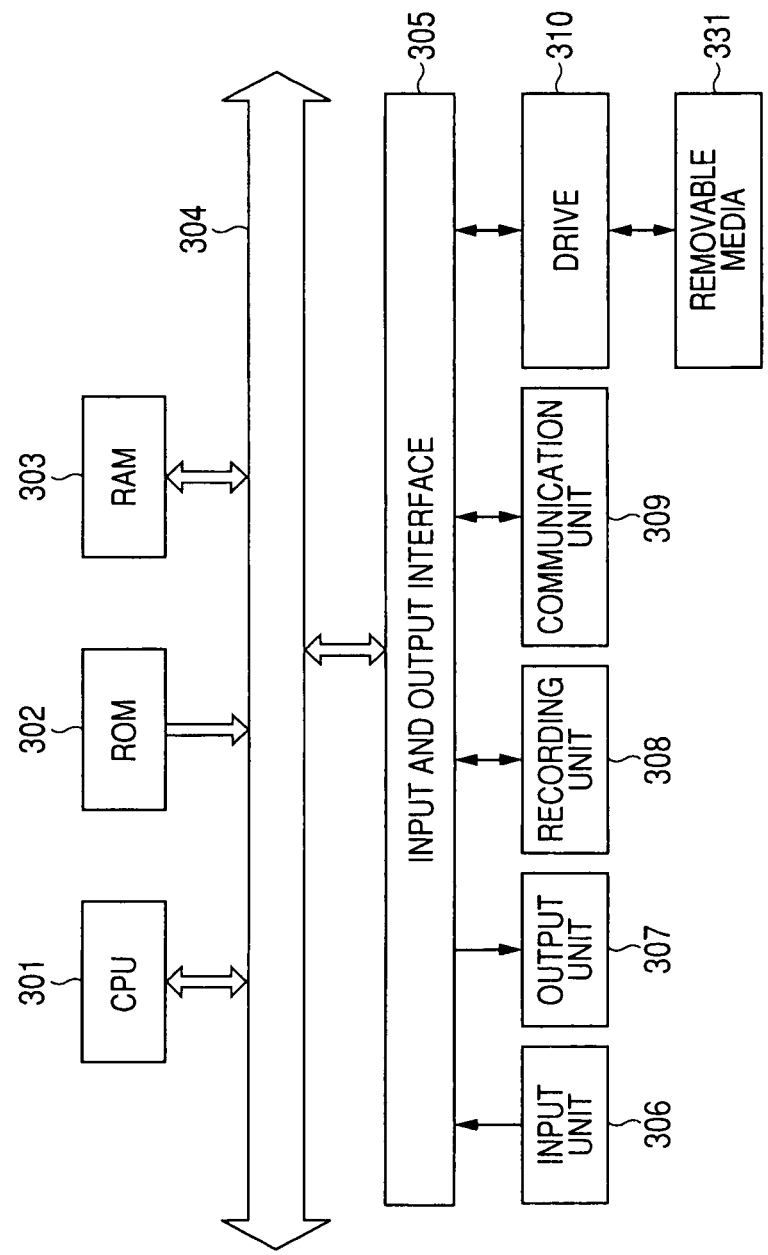

PLAYBACK CONTROL DEVICE, METHOD AND PROGRAM

CROSS REFERENCE TO RELATED APPLICATIONS

The present invention contains subject matter related to Japanese Patent Application JP 2007-019575 filed in the Japanese Patent Office on Jan. 30, 2007, the entire contents of which being incorporated herein by reference.

BACKGROUND OF THE INVENTION

1. Field of the Invention

The invention relates to a playback control device, a method and a program thereof, particularly, relates to a playback control device, a method and a program thereof which can play back still pictures and moving pictures sequentially.

2. Description of the Related Art

In related arts, imaging apparatuses such as a digital still camera which takes still pictures are known. In such imaging apparatuses, there is one which includes a so-called slide show function playing back taken still pictures sequentially in the order previously determined such as the order of taken dates, or one which includes a function of taking not only still pictures but also moving pictures.

Also in imaging apparatuses, there is one which includes a function of selecting and playing back still pictures in which pictures of faces of a given person are included or scenic pictures which are still pictures in which pictures of the person are not included in the taken still pictures, using face information indicating characteristics of human faces (for example, refer to JP-A-2006-323621 (Patent Document 1)).

SUMMARY OF THE INVENTION

Particularly in recent years, along with improvement of the ability of taking pictures of imaging apparatuses, the imaging apparatus having the function which can take not only still pictures but also moving pictures comes to be widely used, and a function of playing back taken still pictures and moving pictures sequentially is desired in an application program which performs slide show display of pictures.

However, the main subjects when taking pictures in the imaging apparatus are still pictures, and even when there are both still pictures and moving pictures as pictures for slide show display, the imaging apparatus could merely play back only still pictures to perform slide show display.

In addition, an application program playing back still pictures and moving pictures sequentially in the predetermined order in a personal computer has been proposed, however, it is difficult to playback only still pictures and moving pictures desired by a user.

Specifically, when the user operates the personal computer to play back still pictures and moving pictures sequentially, the user designates a folder in which desired still pictures and moving pictures are stored and instructs playback of still pictures and moving pictures stored in the folder. For example, in the case that the user desires to sequentially play back still pictures and moving pictures taken by himself/herself using the imaging apparatus, when a folder is designated, which stores, in addition to the taken still pictures and moving pictures, moving pictures acquired from a server which have no relation to the taken still pictures and moving pictures, not only the still pictures and moving pictures taken by the imaging apparatus but also moving pictures having no relation to them are played back.

Thus, it is desirable to simply playing back still pictures and moving pictures sequentially, which are predicted to be desired by the user.

A playback control device according to an embodiment of the invention includes a selection means for selecting a moving picture of a moving picture file having a file name satisfying prescribed conditions or a moving picture of a moving picture file having a prescribed file format, and a still picture in still pictures and moving pictures, and a playback control means for controlling playback of the still pictures and the moving pictures so that still pictures and the moving pictures selected by the selection means are played back sequentially in the prescribed order.

It is possible to allow the selection means to select the moving picture of the moving picture file which is compliant with a previously prescribed standard based on the file name and the file format.

When a given operation was performed by the user to an input means operated when instructing playback control of the still picture and the moving picture during playback of the moving picture selected by the selection means, it is possible to allow the playback control means to control playback of the moving picture during playback so that playback of a still picture or a moving picture which is previous or next to the moving picture during playback in the prescribed order is started.

When the given operation is performed when only one moving picture designated by the user is played back, it is possible to perform control which is different from playback control performed according to the given operation during playback of the moving picture selected by the selection means.

When the given operation was performed during playback of the still picture selected by the selection means, it is possible to allow the playback control means to control playback of the still picture during playback so that playback of a still picture or a moving picture which is previous or next to the still picture during playback in the prescribed order is started.

When playback of one moving picture selected by the selection means ended, it is possible to allow the playback control means to control playback of the still picture and the moving picture so that a next still picture or moving picture selected by the selection means is played back.

A playback control method or a program according to an embodiment of the invention includes steps of selecting a moving picture of a moving picture file having a file name satisfying prescribed conditions or a moving picture of a moving picture file having a prescribed file format and a still picture in still pictures and moving pictures by a selection means, and controlling playback of the still pictures and the moving pictures so that still pictures and the moving pictures selected by the selection means are played back sequentially in the prescribed order.

According to an embodiment of the invention, a moving picture of a moving picture file having a file name satisfying prescribed conditions, a moving picture of a moving picture file having a prescribed file format or a still picture are selected in still pictures and moving pictures by the selection means and playback of the still pictures and the moving pictures is controlled so that still pictures and the moving pictures selected by the selection means are played back sequentially in the prescribed order.

According to an embodiment of the invention, still pictures and moving pictures can be played back sequentially. Particularly, according to an embodiment of the invention, still pictures and moving pictures which are predicted to be desired by the user can be easily played back sequentially.

BRIEF DESCRIPTION OF THE DRAWINGS

FIG. 3 is a chart explaining processing performed with respect to operations performed during playback of a moving picture;

FIG. 7 is a flowchart explaining moving-picture playback processing; and

FIG. 8 is a block diagram showing a configuration of a personal computer.

DESCRIPTION OF THE PREFERRED EMBODIMENTS

Embodiments of the invention will be described below, and the correspondence between constituent features of the invention and embodiments described in the specification or the drawings is exemplified as follows. The description is made for confirming that embodiments which support the invention are written in the specification or the drawings. Therefore, if there is an embodiment that is written in the specification and the drawings but not written here as the embodiment corresponding to a constituent feature of the invention, that does not mean that the embodiment does not correspond to the constituent feature. Conversely, if an embodiment is written here as the embodiment corresponding to a constituent feature, that does not mean that the embodiment does not correspond to a constituent feature other than that constituent feature.

A playback control device according to an embodiment of the invention includes a selection means (for example, a list generation unit 91 in FIG. 4) for selecting a moving picture of a moving picture file having a filename satisfying prescribed conditions or a moving picture of a moving picture file having a prescribed file format and a still picture in still pictures and moving pictures, and a playback control means (for example, a still picture display control unit 92 and a moving picture display control unit 93) for controlling playback of the still pictures and the moving pictures so that still pictures and the moving pictures selected by the selection means are played back sequentially in the prescribed order.

Figure 6:
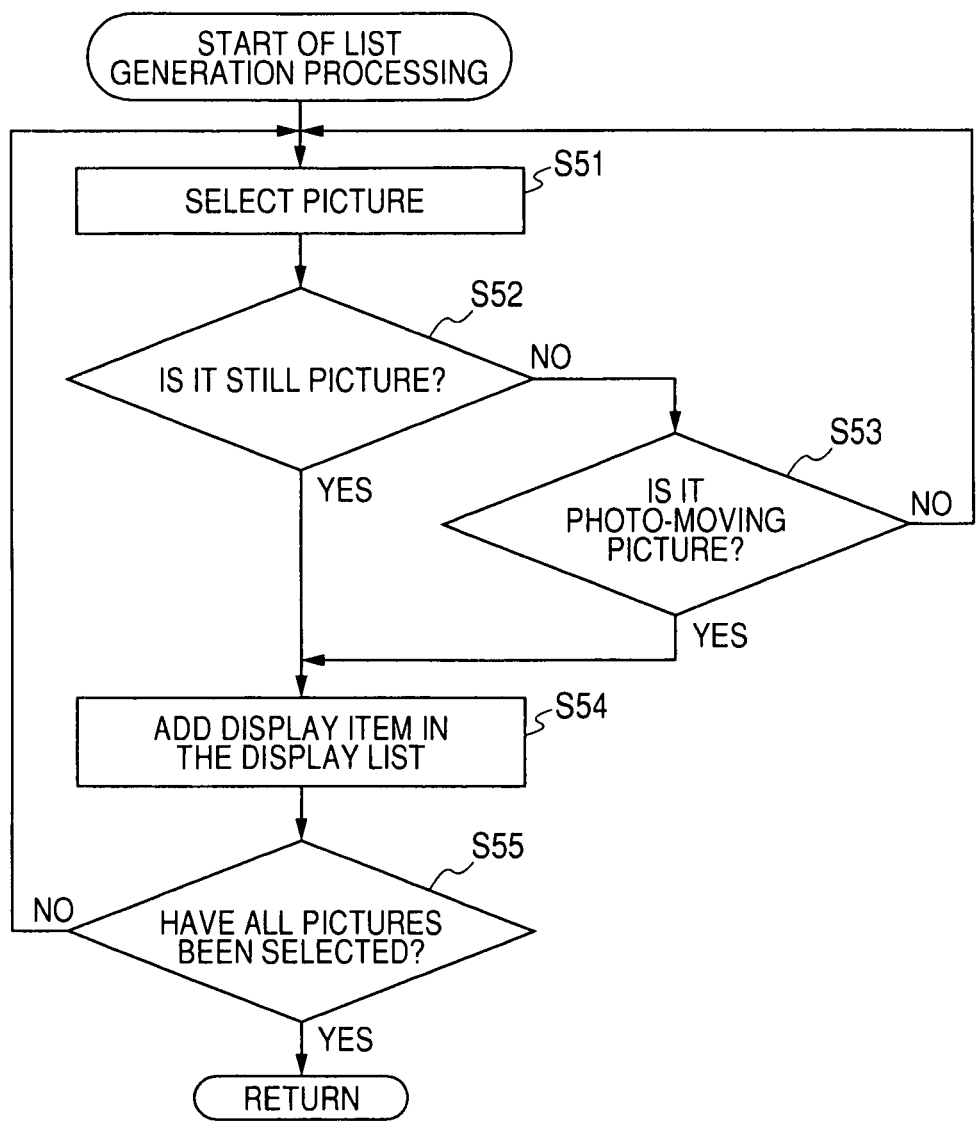
FIG. 6 is a flowchart explaining list generation processing.

It is possible to allow the selection means to select the moving picture of the moving picture file which is compliant with a previously prescribed standard based on the file name and the file format (for example, processing of Step S53 of FIG. 6).

When a given operation was performed by the user to an input means operated when instructing playback control of the still picture and the moving picture during playback of the moving picture selected by the selection means, it is possible to allow the playback control means to control playback of the moving picture during playback so that playback of a still picture or a moving picture which is previous or next to the moving picture during playback in the prescribed order is started (for example, processing of Step S85 or Step S89 of FIG. 7).

Figure 5:
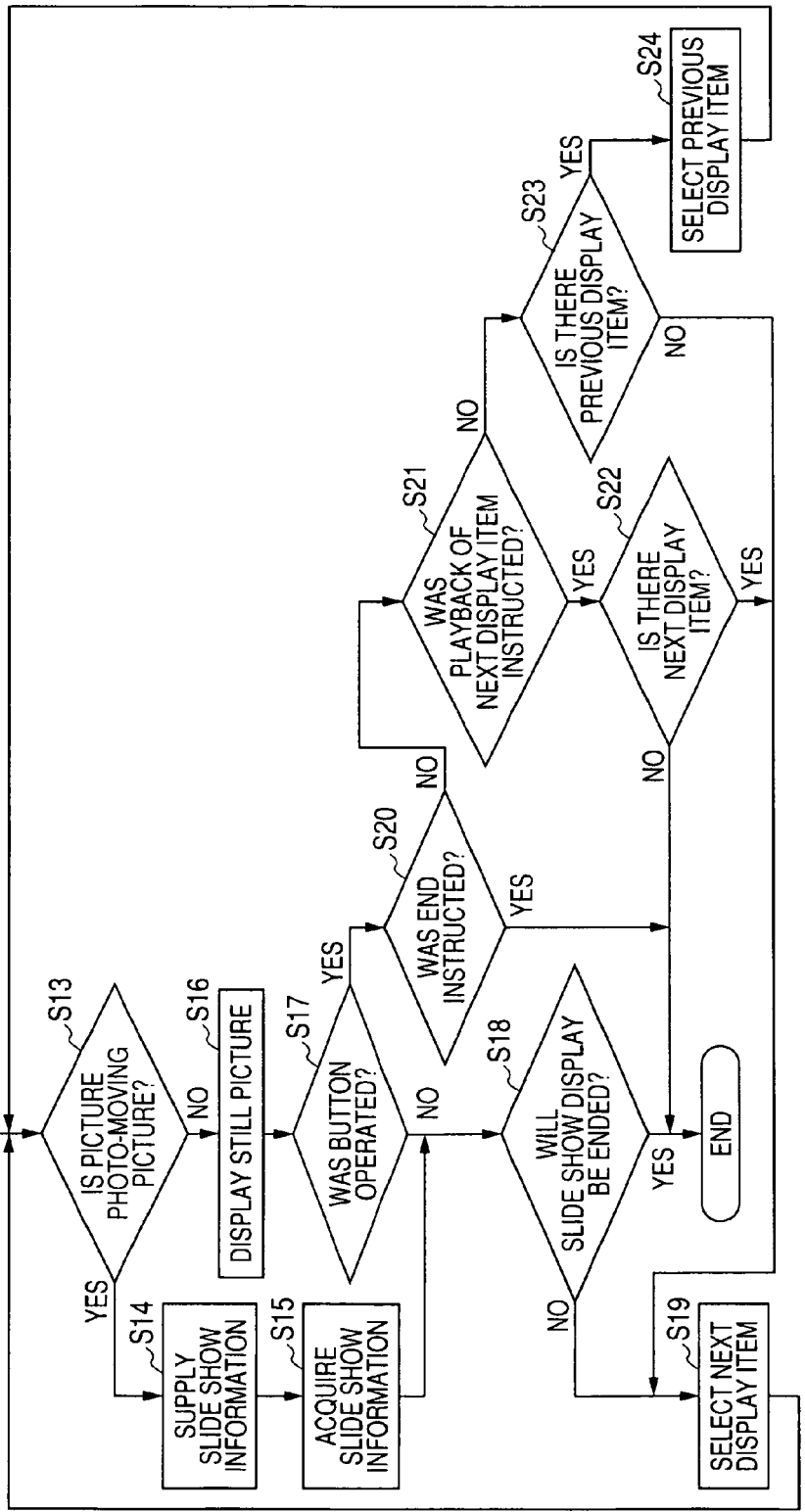
FIG. 5 is a flowchart explaining slide show display processing.

When the given operation was performed during playback of the still picture selected by the selection means, it is possible to allow the playback control means to control playback of the still picture during playback so that playback of a still picture or a moving picture which is previous or next to the still picture during playback in the prescribed order is started (for example, processing of Step S22 and Step S19, or Step S24 of FIG. 5).

When playback of one moving picture selected by the selection means ended, it is possible to allow the playback control means to control playback of the still picture and the moving picture so that a next still picture or moving picture selected by the selection means is played back (for example, processing of Step S96 and Step S97 of FIG. 7).

A playback control method or a program according to an embodiment of the invention includes steps of selecting (for example, processing of Step S52 to Step S54 of FIG. 6) a moving picture of a moving picture file having a file name satisfying prescribed conditions or a moving picture of a moving picture file having a prescribed file format and a still picture in still pictures and moving pictures by a selection means (for example, a list generation unit 91 of FIG. 4), and controlling (for example, processing explained with reference to FIG. 5 and FIG. 7) playback of the still pictures and the moving pictures so that still pictures and the moving pictures selected by the selection means are played back sequentially in the prescribed order.

Hereinafter, embodiments to which the present invention is applied will be explained with reference to the drawings.

Figure 1:
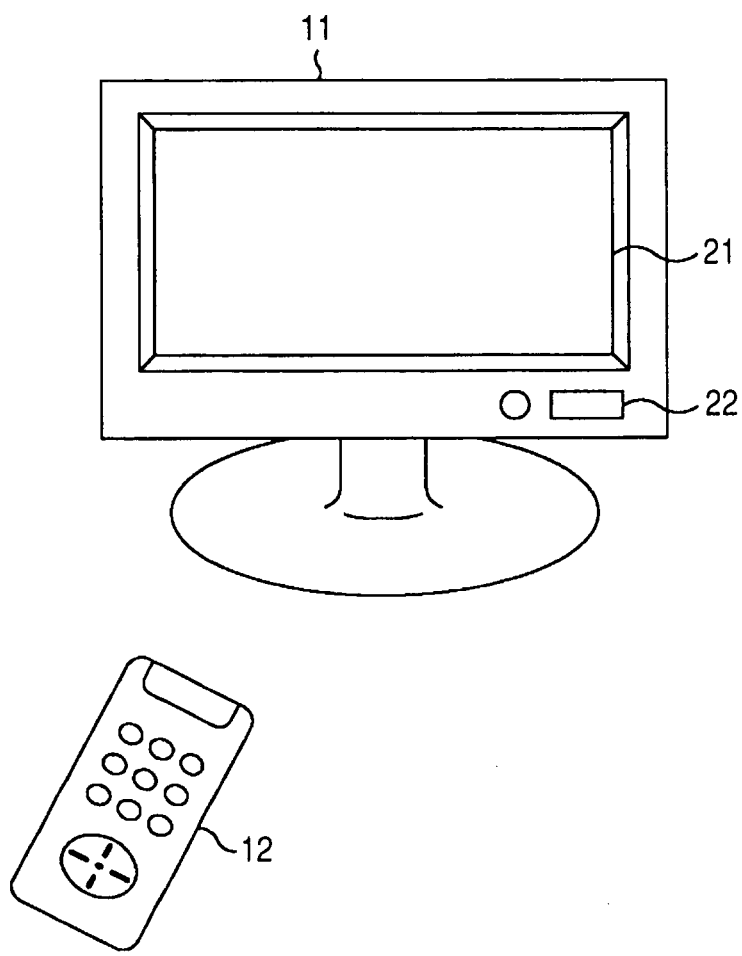
FIG. 1 is a view showing a configuration example of the appearance of a display device according to an embodiment to which the invention is applied.

FIG. 1 is a view showing a configuration example of the appearance of a display device according to an embodiment to which the invention is applied.

The display device 11 includes, for example, a television receiver. The display device 11 is provided with a display unit 21 including a LCD (Liquid Crystal Display) displaying pictures and the like and a light receiving unit 22 receiving command signals which are infrared signals transmitted from a remote commander 12.

The remote commander 12 is operated by a user, which generates command signals instructing execution of processing according to user's operations such as control of picture playback or on/off of the power in the display device 11 and transmits the signals to the display device 11.

For example, the user operates the remote commander 12 to designate a given folder recorded in the display device 11, and can play back still pictures and moving pictures (in more detail, moving pictures of moving picture files compliant with a standard) compliant with the previously prescribed standard such as DCF (Design rule for Camera File System) in still pictures and moving pictures stored in the folder sequentially in the prescribed order.

The moving picture compliant with the previously prescribed standard is a moving picture taken by an imaging apparatus such as a digital still camera. In the following description, the moving picture compliant with the previously prescribed standard is called as a photo-moving picture. Also in the following description, when it is not necessary to particularly discriminate a still picture from a moving picture, it is also simply called as a picture, and processing of playing back pictures in the prescribed order is called as a slide show display.

When the remote commander 12 is operated and the slide show display of pictures is instructed by the user, the remote commander 12 generates a command signal for instructing the slide show display according to the operation by the user and transmits the signal to the display device 11.

Then, the light receiving unit 22 of the display device 11 receives the command signal transmitted from the remote commander 12 and the display device 11 performs the slide show display of still pictures and the photo-moving pictures stored in the folder designated by the user on the display unit 21 based on the received command signal.

Figure 2:
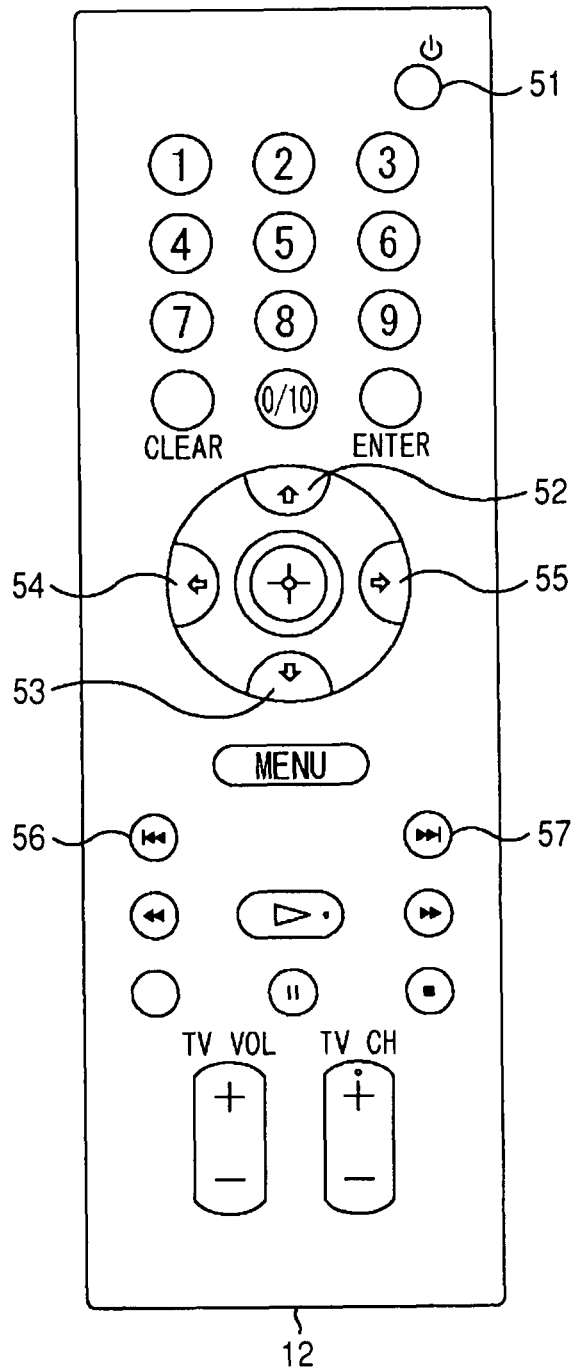
FIG. 2 is a view explaining buttons provided on a remote commander.

In the remote commander 12 operated by the user, buttons operated when instructing execution of various processing are provided as shown, for example, in FIG. 2.

Specifically, in the drawing of the remote commander 12, a button 51 operated when turning on or off the power of the display device 11 is provided on the upper side, and select buttons operated when selecting channels of television broadcasting programs are provided below the button 51.

Below the select buttons, there are provided an upper button 52 operated when playing back a content which is previous for one content in order of playback, namely, a still picture or a photo-moving picture which is just before the picture during playback, a lower button 53 operated when playing back a next content, a left button 54 operated when performing fast rewinding of a moving picture during playback and a right button 55 operated when performing fast forwarding of the moving picture during playback, when a picture as a content to be displayed in a slide show manner is played back.

On the upper button 52, the lower button 53, the left button 54 and the right button 55, an upward arrow, a downward arrow, a leftward arrow and a rightward arrow are printed respectively as shown in the drawing.

Below the lower button 53 of the remote commander 12 in the drawing, there are provided a previous button 56 operated when playing back a content which is previous for one content in order of playback (order of display) and a next button 57 operated when playing back a next content, when a photo-moving picture is played back as a content to be displayed in the slide show manner. Further, below the previous button 56 and the next button 57, a playback start button operated when instructing the start of playing back pictures, a stop button operated when instructing the stop of playing back pictures, a volume button operated when adjusting the volume of played audio and so on are provided.

The user operates these buttons provided in the remote commander 12 to play back pictures on the display device 11.

By the way, even when the same operation is performed to the remote commander 12 by the user, the display device 11 performs different processing when the remote commander 12 is operated during playback of the photo-moving picture as one content to be displayed in the slide show manner and when the remote commander 12 is operated during playback of an optional moving picture designated by the user (hereinafter, suitably referred to as a video-moving picture) not as a content to be displayed in the slide show manner.

In other words, when the display device 11 performs control of playing back moving pictures with respect to the same operation performed to the remote commander 12, the display device 11 performs different controls during playback of the video-moving picture and during playback of the photo-moving picture as a content to be displayed in the slide show manner.

Specifically, when the remote commander 12 is operated during playback of the photo-moving picture or the video-moving picture, processing corresponding to the operation by the user is performed in the display device 11 as shown in FIG. 3.

Specifically, in FIG. 3, buttons of remote controller 12 operated by the user are shown in a column "key operation", controls of playback performed when the buttons shown in the column "key operation" are operated during playback of the photo-moving picture in the slide show display are shown in a column "photo-moving picture", and controls of playback performed when the button shown in the column "key operation" are operated during playback of the video-moving picture are shown in a column "video-moving picture". Characters "EOF" in the column "key operation" indicates that the playback of the moving picture has ended, that is, that the moving picture has been played back until the end.

When each button in the upper button 52, the lower button 53, the left button 54, the right button 55, the previous button 56, and the next button 57 is operated during playback of the photo-moving picture in the slide show display, the display device 11 controls playback of the photo-moving picture during playback so as to perform playback of a content which is previous for one content in order of playback, playback of a next content, fast rewinding playback, fast forwarding playback, playback of a content which is previous for one content and playback of a next content, respectively.

When the photo-moving picture was played back until the end in the slide show display, the display device 11 performs control so that playback of a content (a still picture or a photo-moving picture) next to the photo-moving picture which was played back until the end in order of playback is started.

On the other hand, when each button in the upper button 52, the lower button 53, the left button 54, the right button 55, the previous button 56, and the next button 57 is operated during playback of the video-moving picture, the display device 11 controls playback of the video-moving picture during playback so as to perform movement to a position 30 seconds after the playing position, movement to a position 15 seconds before the playing position, fast rewinding playback, fast forwarding playback, playback from the top of a chapter just before the chapter during playback in chapters included in the video-moving picture and playback from the top of a chapter just after the chapter during playback.

When the video-moving picture was played back until the end, the display device 11 temporarily stops in a state in which a picture in a last frame in the video-moving picture played back was displayed in the display part 21.

When the upper button 52, the lower button 53, the previous button 56, the next button 57 are operated respectively during playback of a still picture in the slideshow display, the display device 11 controls playback of the still picture so as to perform playback of a content which is previous for one content in order of playback, playback of a next content, playback of a content which is previous for one content and playback of a next content.

When a predetermined time passed since the still picture had been displayed (played back) in the slide show display, the display device 11 performs control so that playback of a content (a still picture or a photo-moving picture) next to the played still picture is started. Also, when any of the left button 54 and the right button 55 is operated during playback of the still picture in the slide show display, the display device 11 does not perform any particular processing, and plays back a next content when the predetermined time passed since the still picture had been displayed.

When a video-moving picture is played back, it is different from the playback of moving pictures in the slide show display and is not necessary to play back moving pictures or still pictures sequentially as contents, therefore, it is sufficient that controls of playback such as fast rewinding, fast forwarding are performed with respect to one video moving picture during playback.

On the other hand, since plural contents (still pictures and photo-moving pictures) are played back sequentially in the slide show display, when the photo-moving picture as a content is played back, it is convenient that the user can instruct the start of playback of a content which is previous for one content or a next content in order of playback, that is, jump playback to previous and next contents even during playback of the photo-moving picture.

When the upper button 52, the lower button 53, the previous button 56 and the next button 57 are operated during playback of the photo-moving picture in the slide show display, the display device 11 performs processing specialized for the slide show display, which is different from the case during playback of the video-moving picture, that is, the same processing as in the case of playback of still pictures as a content to be displayed in the slide show manner, controlling playback of contents so that playback of previous and next contents are started.

When the upper button 52, the lower button 53, the previous button 56, and the next button 57 are operated during playback of the photo-moving picture in the slide show display from the standpoint of sequential playback of contents as described above, the playback of the photo-moving picture is controlled so that the same processing as in the case when these buttons are operated during playback of the still picture in the slide show display is performed, thereby dealing with still pictures and photo-moving pictures equivalently in the slide show display. Accordingly, the user can playback contents smoothly with simple operation even when there are both still pictures and photo-moving pictures as contents to be displayed in the slide show manner.

Figure 4:
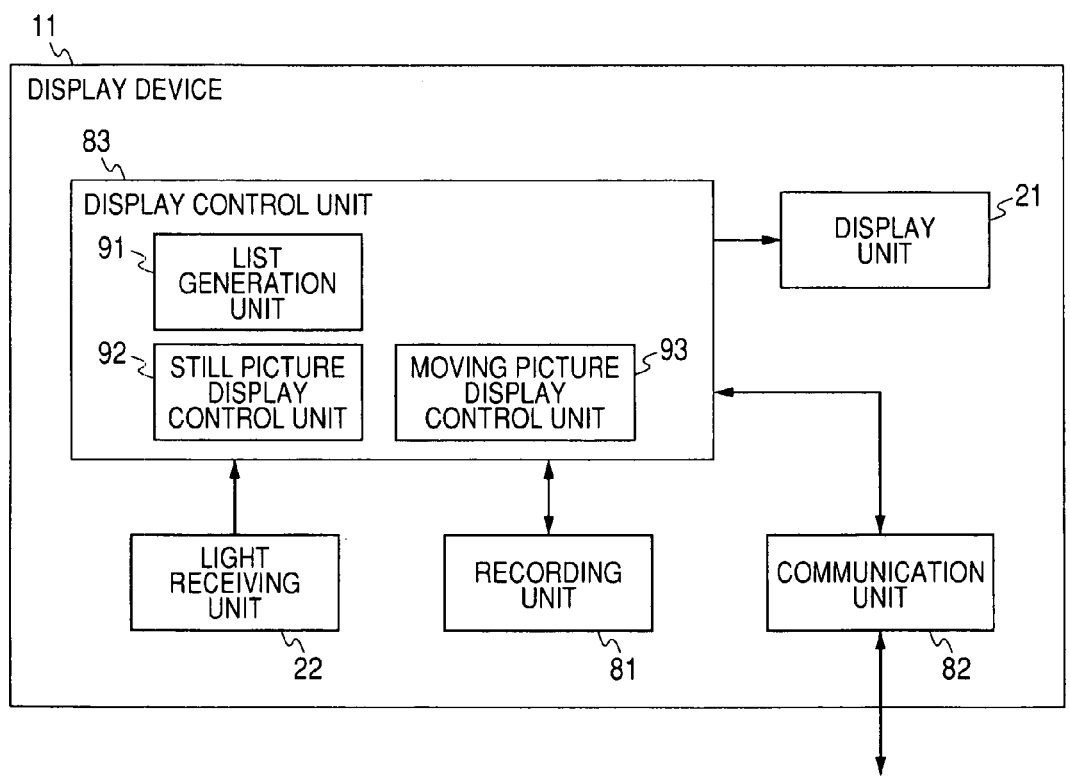
FIG. 4 is a block diagram showing a configuration operation of a display device.

FIG. 4 is a block diagram showing a configuration example of the display device 11 of FIG. 1. In FIG. 4, the same numerals are put to parts corresponding to parts in FIG. 1, and explanations thereof are suitably omitted.

The display device 11 includes the display unit 21, the light receiving unit 22, a recording unit 81, a communication unit 82 and a display control unit 83.

The light receiving unit 22 receives a command signal transmitted from the remote commander 12 and photoelectrically converts the received command signal into a control signal which is an electrical signal. Then, the light receiving unit 22 supplies the control signal obtained by the photoelectric conversion to the display control unit 83.

The recording unit 81 includes, for example, hard disc built in the display device, and removable media such as an optical disc and a semiconductor memory which can be attached or removed to and from the display device 11, which records various data such as still pictures and moving pictures. The recording unit 81 records data such as still pictures and moving pictures supplied from the display control unit 83.

The communication unit 82 performs communication with other devices connected to the display device 11 through communication networks including, for example, Internet, transmitting and receiving various data. For example, the communication unit 82 receives still pictures and moving pictures to be displayed in the slide show manner instructed by the user to the display control unit 83, which have been transmitted from another device through the communication network.

The display control unit 83 controls playback of still pictures and moving pictures recorded in the recording unit 81 according to the control signal supplied from the light receiving unit 22. The display control unit 83 also supplies and records data supplied from the communication unit 82 in the recording unit 81.

The display control unit 83 includes a list generation unit 91, a still image display control unit 92 and a moving picture display control unit 93. The list generation unit 91 to the moving picture display control unit 93 can give and receive data mutually.

The list generation unit 91 of the display control unit 83 refers to the folder designated by the user, which is recorded in the recording unit 81 according to the control signal from the receiving unit 22 and generates a display list of still pictures and photo-moving pictures to be displayed in the slide show manner. Specifically, the list generation unit 91 regards respective still pictures and photo-moving pictures stored in the folder designated by the user as contents to be displayed in the slide show manner, and generates the display list in which display items as information indicating these contents are arranged in the prescribed order.

The still picture display control unit 92 is realized when, for example, the display control unit 83 executes an application program controlling playback of still pictures. The still picture display control unit 92 acquires still pictures recorded in the recording unit 81, more specifically, a still-picture file by referring to the display list generated by the list generation unit 91 if necessary and supplies the file to the display unit 21 to display the still pictures on the display unit 21.

The moving picture display control unit 93 is realized when, for example, the display control unit 83 executes an application program controlling playback of moving pictures. The moving picture display control unit 93 acquires moving pictures recorded in the recording unit 81, more specifically, a moving-picture file by referring to the display list generated by the list generation unit 91 if necessary and supplies the file to the display unit 21 to display the moving pictures on the display unit 21.

When the user operates the remote commander 12 to designate a folder recorded in the recording unit 81 or a folder recorded in another device which is connected to the display device 11 through the communication network and to instruct the slide show display of pictures stored in the folder, the display device 11 starts slide show display processing which is the processing displaying pictures in the slide show manner.

Hereinafter, slide-show display processing by the display device 11 will be explained with reference to a flowchart in FIG. 5.

In Step S11, the display device 11 performs list generation processing. The detail of the list generation processing will be described later. In the list generation processing, the display device 11 generates a display list of still pictures or photo-moving pictures to be displayed in the slide show manner from now.

For example, when the user operates the remote commander 12 to designate a folder recorded in the recording unit 81, the list generation unit 91 of the display unit 11 generates a display list in which respective display items indicating respective still pictures and photo-moving pictures stored in the folder are arranged in the order of display (playback) by referring to the folder designated by the user, which is recorded in the recording unit 81.

For example, when the user operates the remote commander 12 to designate a folder recorded in another device connected to the display device 11, the display control unit 83 instructs the communication unit 82 to acquire the folder designated by the user based on the control signal according to the operation of the user supplied from the light receiving unit 22. The communication unit 82 acquires the designated folder from another device through the communication network according to the instruction of the display control unit 83. That is, the communication unit 82 receives still pictures and the moving pictures stored in the designated folder, which has been transmitted from another device to supply them to the display control unit 83.

Then, the display control unit 83 supplies the still pictures and moving pictures supplied from the communication unit 82 to the recording unit 81, storing them in a new folder to be recorded temporarily. The list generation unit 91 of the display control unit 83 generates a display list in which respective display items indicating respective still pictures and photo-moving pictures stored in the newly-recorded folder are arranged.

An example in which still pictures and photo-moving pictures stored in the folder designated by the user are displayed in the slide show manner will be explained, and, it is preferable that the user operates the remote controller 12 to directly designate pictures to be displayed in the slide show manner, or to designate pictures grouped in some method. In the following explanation, the explanation will be continued under the condition that the user designate the folder previously recorded in the recording unit 81 and instructs the slide show display.

When the display list of still pictures and the photo-moving pictures to be displayed in the slide show manner is generated, the still picture display control unit 92 selects the first display item, namely, the display item indicating still pictures or photo-moving pictures displayed first in the display list by referring to the display list generated by the list generation unit 91 in Step S12.

In Step S13, the still picture display control unit 92 judges whether the picture indicated by the selected display item is a photo-moving picture or not.

When it is judged that the picture is the photo-moving picture in Step S13, the still picture display control unit 92 generates slide show information which is information concerning the slide show display and supplies it to the moving picture display control unit 93 in Step S14.

The slide show information includes delivery source information, that is, a delivery source of slide show information indicating a block where the slideshow information was generated, information indicating whether during slide show display or not, display item information indicating a display item to be played back next, and input switching information which is information indicating various setting concerning pictures to be inputted such as a file format or picture quality of pictures to be inputted as pictures to be played back.

Therefore, for example, when the selected first display item indicates the photo-moving picture, the still picture display control unit 92 generates slide show information including delivery source information indicating the still picture display control unit 92 as the delivery source for the slide show information, information indicating that the display is performed in the slide show manner, display item information indicating the first display item and input switching information indicating setting such as the file format of pictures, for example, MPEG2 (Moving Picture Experts Group phase 2), and supplies the information to the moving picture display unit 93.

In addition, for example, when the communication unit 82 receives still pictures and moving pictures transmitted from another device through the communication network in accordance with a standard such as DLNA (Digital Living Network Alliance), the file format of pictures in the input switching information will be MPEG2 or MPEG2-PS (Moving Picture Experts Group phase 2-Program Stream) and the like.

When the slide show information is supplied from the still picture display control unit 92 to the moving picture display control unit 93, the moving picture display control unit 93 plays back the photo-moving picture indicated by the display item information based on the supplied slide show information as described later. When the display item next to the played display item in the display list generated by the list generation unit 91 indicates a photo-moving picture, the moving picture display control unit 93 also plays back that photo-moving picture.

When the playback of the photo-moving picture is ended, the moving picture display control unit 93 generates slide show information including delivery source information indicating the moving picture display control unit 93 as the delivery source for the slide show information, information indicating that the display is performed in the slide show manner, display item information indicating a display item to be played back next as the display item to be played back and input switching information indicating setting concerning pictures to be inputted, and supplies the information to the still picture display control unit 92. During playback of the photo-moving picture, when the end of the slide show display is instructed by the user, the moving picture display control unit 93 generates slide show information including information that the end of slide show display has been instructed and supplies the information to the still picture display control unit 92.

When the photo-moving picture is played back by the moving picture display control unit 93, in Step S15, the still picture display control unit 92 acquires slide show information from the moving picture display control unit 93, then, the process proceeds to Step S18. That is, when the playback of the photo-moving picture ended or when the end of slide show display was instructed by the user, the moving picture display control unit 93 generates the slide show information and supplies it to the still picture display control unit 92, and the still picture display control unit 92 receives supply of the slide show information. The still picture display control unit 92 performs setting concerning pictures to be inputted based on input switching information included in the slide show information.

In Step S13, when it is judged that the picture indicated by the selected display item is not the photo-moving picture but the still picture, the still picture display control unit 92 displays the still picture indicated by the display item on the display unit 21 in Step S16.

Specifically, the still picture display control unit 92 acquires the still picture indicated by the display item from the recording unit 81 and supplies the picture to the display unit 21, and the display unit 21 displays the still picture supplied from the still picture display control unit 92.

In Step S17, the still picture display control unit 92 judges whether buttons of the remote commander 12 was operated by the user or not.

When the user operates a button provided in the remote commander 12, the remote commander 12 transmits a command signal according to the operation by the user to the display device 11. The light receiving unit 22 of the display device 11 receives the command signal transmitted from the remote commander 12 and photoelectrically converts the signal, and supplies the control signal obtained by the conversion to the display control unit 83. The still picture display control unit 92 judges that the button was operated when the control signal was supplied from the light receiving unit 22.

For further details, when still picture is displayed on the display unit 21, if the control signal is not supplied to the still picture display control unit 92 from the light receiving unit 22 even when the predetermined time, namely, time during which the still picture is displayed continuously passed since the still picture had been displayed, it is judged that the button was not operated.

In Step S17, when it is judged that the button was not operated, the process proceeds to Step S18.

When it is judged that the button was not operated in Step S17, or when slide show information was obtained in Step S15, the still picture display control unit 92 judges whether the slide show display will be ended or not in Step S18. For example, when playback of the last display item of the display list ended, or the slide show information supplied from the moving picture display control unit 93 includes information indicating that the end of slide show display was instructed, it is judged that the slide show display will be ended.

In Step S18, when it is judged that the slide show display will be ended, the display device 11 ends processes performed by respective units to end the slide show display processing.

On the other hand, when it is judged that the slide show display will not be ended, that is, it is judged that the slide show display will be continuously performed, the still picture display control unit 92 selects a next display item in the display list generated by the list generation unit 91 in Step S19. For example, when the still picture is displayed in the display unit 21, the still picture display control unit 92 selects a next display item next to the display item indicating the still picture displayed on the display unit 21 in display items of the display list as a display item indicating the picture to be played back next.

For example, when the photo-moving picture was played back and slide show information was supplied from the moving picture display control unit 93 to the still picture display control unit 92, the still picture display control unit 92 selects a display item indicated by the slide show information as a display item indicating the picture to be played back next.

When the next display item indicating the picture to be played back next is selected in Step S19, the process returns to Step S13, and the above processes are repeated.

When it is judged that a button of the remote commander 12 was operated by the user in Step S17, the still picture display control unit 92 judges whether the end of slide show display was instructed or not in Step S20.

For example, when the user operated the remote commander 12 to instruct the end of slide show display, and the control signal instructing the end of slide show display was supplied from the light receiving unit 22 to the still picture display control unit 92 according to the operation by the user, it is judged that the end of slide show display was instructed.

In Step S20, when it is judged that the end of slide show display was instructed, the display device 11 ends processes performed by respective units to end the slide show display processing.

On the other hand, when it is judged that the end of slide show display was not instructed, the still picture display control unit 92 judges whether playback of a next display item was instructed or not in Step S21.

For example, when the user operated the lower button 53 or the next button 57 of the remote commander 12 and the control signal indicating that the lower button 53 was operated or the control signal indicating that the next button 57 was operated was supplied from the light receiving unit 22 to the still picture display control unit 92 according to the operation by the user, it is judged that playback of the next display item was instructed.

For example, when the user operated the upper button 52 or the previous button 56 of the remote commander 12 and the control signal indicating that the upper button 52 was operated or the control signal indicating that the previous button 56 was operated is supplied from the light receiving unit 22 to the still picture display control unit 92 according to the operation by the user, it is judged that playback of the next display item was not instructed.

When it is judged that playback of the next display item was instructed in Step S21, the still picture display control unit 92 judges whether there is a display item next to the display item during playback in order of playback in the display list or not, namely, whether there is a display item next to the display item indicating the still picture displayed on the display unit 21.

When it is judged that there is not a next display item in Step S22, after the still picture displayed on the display unit 21 is continuously displayed until the predetermined time passes from the start of display, it is judged that playback of pictures indicated by all display items in the display list has ended, and the slide show display processing ends.

On the other hand, when it is judged that there is a next display item in Step S22, the process proceeds to Step S19 and a next display item is selected and the picture indicated by the selected display item is played back.

In addition, when it is judged that playback of a next display item was not instructed in Step S21, that is, when the control signal indicating that the upper button 52 was operated or the control signal indicating that the previous button 56 was operated is supplied from the light receiving unit 22 to the still picture display control unit 92 and playback of a display item which is previous for one display item to the display item indicating the still picture displayed on the display item 21 is instructed, the process proceeds to Step S23.

In Step S23, the still picture display control unit 92 judges whether there is a display item which is previous for one display item to the display item during playback in order of playback or not, that is, whether there is a display item which is previous to the display item indicating the still picture displayed on the display unit 21 or not.

When it is judged that there is not a previous display item in Step S23, that is, when the still picture displayed on the display unit 21 is the still picture indicated by the first display item in the display list, the process proceeds to Step S19 after the still picture displayed on the display unit 21 is displayed continuously until the predetermined time passes from the start of display, where a next display item is selected and the picture indicated by the selected display item is played back.

On the other hand, when it is judged that there is a previous display item, the process proceeds to Step S24. In Step S24, the still picture display control unit 92 selects the display item which is previous for one display item to the display item during playback in the display list generated by the list generation unit 91, then, the process returns to Step S13, where the picture indicated by the selected display item is played back.

Accordingly, the display device 11 generates the display list and plays back still pictures and photo-moving pictures sequentially according to the generated display list. When the picture indicated by the display item in the display list is a still picture, the still picture display control unit 92 of the display device 11 plays back the still picture and displays it on the display unit 21, and when the picture indicated by the display item is a photo-moving picture, the still picture display control unit 92 supplies slide show information to the moving picture display control unit 93 to play back the photo-moving picture.

When the picture indicated by the display item is the still picture as described above, the still picture display control unit 92 controls playback of the still picture, and when the picture indicated by the display item is the photo-moving picture, the moving picture display control unit 93 controls playback of the photo-moving picture, thereby playing back these pictures sequentially even when there are both still pictures and moving pictures in the folder designated by the user.

Next, list generation processing corresponding to the process of Step S11 in FIG. 5 will be explained with reference to a flowchart of FIG. 6.

In Step S51, the list generation unit 91 selects one picture stored in a folder designated by the user.

For example, when still pictures and moving pictures are played back sequentially in order of dates when these still pictures and moving pictures were taken, the list generation unit 91 selects the picture whose taken date is oldest in still pictures and moving pictures which have not been selected yet, which are stored in the folder designated by the user in the recording unit 81 based on the control signal supplied from the light receiving unit 22.

In Step S52, the list generation unit 91 judges whether the selected picture is a still picture or not. For example, the list generation unit 91 judges that the picture is the still picture in the case that the selected picture, particularly, an extension of a picture file of the selected picture is an extension "jpg" indicating the picture file compressed in a JPEG (Joint Photographic Experts Group) format (picture file in the JPEG format).

In Step S52, when it is judged that the selected picture is a still picture, process proceeds to Step S54.

On the other hand, when it is judged that the selected picture is not a still picture in Step S52, the list generation unit 91 judges whether the selected picture is a photo-moving picture or not, namely, whether the selected picture, particularly, a picture file of the selected picture is the picture file compliant with the previously prescribed standard or not in Step S53.

For example, when the previously prescribed standard is DCF, that is, when the moving picture of the picture file compliant with the DCF standard is a photo-moving picture, the list generation unit 91 judges that the selected picture is the photo-moving picture when a file name of the picture file is a file name peculiar to the picture file compliant with DCF, which satisfies given conditions, as well as when a file format of the picture file is the predetermined given file format.

That is to say, the list generation unit 91 judges that the selected picture is the photo-moving picture when the file name is the file name put in accordance with the DCF standard as well as when the picture file is the picture file having the file format prescribed in the DCF standard.

More specifically, when an extension of the selected picture file is an extension "mpg" or an extension "mpeg" indicating the picture file compressed in a MPEG2 format (picture file in the MPEG2 format), and when a prefix of the file name, that is, some characters at the top of the filename is a character string "MOV" or "MVI", as well as when characters just after the prefix of the file name are 4-digit numerals, the list generation unit 91 judges that the selected picture is the photo-moving picture.

Therefore, for example, when the file name of the picture file including the extension is "MOV0123.mpg", the picture file is regarded as the picture file of the photo-moving picture. For example, when the extension of the picture file is an extension "avi" indicating a file of an AVI (Audio Video Interleaving) format, an extension "mp4" indicating a file of a MP4 format or an extension "m2t" indicating a file of a MPEG-TS (MPEG2-Transport Stream) format, the picture file is not regarded as the picture file of the photo-moving picture.

It is also preferable that the list generation unit 91 judges that the selected picture is the photo-moving picture in any of the cases in which the extension of the selected picture file is the extension indicating the picture file compressed in the MPEG2 format, that is, the case in which the file is the picture file of the MPEG2 format compliant with the DCF standard, the case in which the prefix of the file name is the predetermined character string or the case in which characters just after the prefix of the file name are 4-digit numerals.

As described above, whether the selected picture is the photo-moving picture or not is judged by using the file name and the extension of the picture file, thereby selecting only moving pictures compliant with the desired standard in moving pictures stored in the folder as long as the user does not change the file name or the extension of the picture file intentionally.

In Step S53, when it is judged that the picture is not the photo-moving picture, the selected picture is not the moving picture taken by the imaging apparatus, the process returns to Step S51, and a next picture is selected.

On the other hand, when it is judged that the picture is the photo-moving picture in Step S53, the selected picture is the photo-moving picture taken by the imaging apparatus, therefore, the process proceeds to Step S54.

When it is judged that the picture is the photo-moving picture in Step S53, or when it is judged that the picture is the still picture in Step S52, the list generation unit 91 adds information indicating the selected picture, particularly, the picture file of the selected picture as the display item at the last of the display list in Step S54.

For example, in the display list, display items indicating still pictures and photo-moving pictures are arranged in order of dates when pictures indicated by the display items were taken, namely, the order of playback, putting the display item indicating that the still picture or the photo-moving picture whose taken date is the oldest in the lead in still pictures and photo-moving pictures stored in the folder designated by the user. The list generation unit 91 adds the display item indicating the selected still picture or the photo-moving picture in the display list so that the display item indicating the newly-selected still picture or the photo-moving picture is arranged next to the last display item in display items arranged in order as the display list.

In Step S55, the list generation unit 91 judges whether all pictures (still pictures and moving pictures) stored in the folder designated by the user have been selected or not.

When it is judged that all pictures have not been selected in Step S55, the process returns to Step S51, and processing in which next picture is selected and a display item indicating the picture is added in the display list is performed.

On the other hand, when it is judged that all pictures have been selected in Step S55, the list generation unit 91 stores the display list generated by performing processes from Step S51 to Step S54, and the process proceeds to Step S12 of FIG. 5.

Accordingly, the display device 11 selects still pictures and moving pictures compliant with the previously prescribed standard in pictures stored in the folder to generate a display list in which display items indicating the selected still pictures or moving pictures are arranged in order of playback.

The still pictures and moving pictures compliant with the previously prescribed standard are selected in pictures stored in the folder to generate the display list as described above, thereby simply playing back only still pictures and moving pictures which are predicted to be desired by the user sequentially.

For example, there is a case in which still pictures and photo-moving pictures taken by an imaging apparatus by the user on an event such as a trip are recorded together with moving pictures not taken by the imaging apparatus, which are not relevant to the event at all. In such case, when the user intends to browse pictures to be displayed and recalls memories of the event by allowing still pictures and moving pictures stored in the folder to be displayed in the slide show manner, the user feels that the browsing of pictures taken at the event is interrupted if the moving pictures not relevant to the event at all recorded in the folder are played back, even when pictures desired by the user are just pictures taken at the time of the event.

Then, still pictures and moving pictures compliant with the previously prescribed standard are selected in still pictures and moving pictures stored in the folder to generate a display list, thereby displaying still pictures and moving pictures which are predicted to be browsed by the user, for example, only still pictures and moving pictures taken by the imaging apparatus selectively in the slide show manner, which improves satisfaction degree of the user.

There is a case in which still pictures and moving pictures relevant to each other, which have been taken by the imaging apparatus as still pictures and moving pictures to be displayed in the slide show manner and moving pictures not relevant to these still pictures and moving pictures at all, which have not been taken by the imaging apparatus are supplied to the display device 11 from another device connected to the display device 11 through a communication network, for example, a server on the communication network. Also in such case, still pictures and moving pictures compliant with the previously prescribed standard are selected from still pictures and moving pictures supplied from the server to generate the display list, thereby simply playing back still pictures and moving pictures which are predicted to be desired by the user sequentially.

In the above description, the DCF was explained as an example of the previously prescribed standard, however, moving pictures compliant with other optional standards such as standards used by a digital video camera or a cellular phone can be regarded as photo-moving pictures. It is also preferable that the moving picture based on a moving picture file having the previously prescribed file format such as the MPEG2 format is regarded as the photo-moving picture, not limited to moving pictures compliant with the given standards.

Also with respect to still pictures, the list generation unit 91 may add a display item indicating any of the still pictures compliant with the previously prescribed standard, the still picture having the file name which satisfies given conditions and the still picture having the given file format to the display list as the still pictures to be displayed in the slide show manner.

While the slide show display processing of FIG. 5 is executed, when slide show information is supplied from the still picture display control unit 92 to the moving picture display control unit 93 or when playback of a given video-moving picture is instructed according to the operation of the remote commander by the user, the display device 11 starts moving picture playback processing which is the processing of playing back the moving picture.

Hereinafter, the moving picture playback processing by the display device 11 will be explained with reference to a flowchart of FIG. 7.

In Step S81, the moving picture display control unit 93 starts the playback of a moving picture. For example, when the user operates the remote commander 12 and instructs playback of a given moving picture (video-moving picture), a command signal according to the operation of the user is transmitted from the remote commander 12 to the display device 11. The light receiving unit 22 receives the command signal transmitted from the remote commander 12 and photoelectrically converts the signal, supplying the control signal accordingly obtained as the result of the conversion to the moving picture display control unit 93 of the display control unit 83.

The moving picture display control unit 93 acquires the moving picture instructed by the user from the recording unit 81 and supplies it to the display unit 21 based on the control signal supplied from the light receiving unit 22, displaying the moving picture on the display unit 21.

Also, for example, when slide show information is supplied from the still picture display control unit 92 to the moving picture display control unit 93, the moving picture display control unit 93 performs processing of switching the input to the moving picture of a picture file having the MPEG2 format based on input switching information of the supplied slide show information, performing setting concerning the picture to be inputted, namely, the moving picture to be displayed from now. Then, the moving picture display control unit 93 acquires a photo-moving picture shown by display item information of the slide show information from the recoding unit 81, performing processing such as decompression processing to the acquired photo-moving picture based on the input switching information if necessary. The moving picture display control unit 93 also supplies the photo-moving picture to which processing was performed to the display unit 21 and displays the moving picture on the display unit 21.

In Step S82, the moving picture display control unit 93 judges whether the upper button 52 or the previous button 56 was operated or not. For example, when the user operated the upper button 52 or the previous button 56 of the remote commander 12 and a control signal indicating that the upper button 52 was operated or a control signal indicating that the previous button 56 was operated is supplied from the light receiving unit 22 to the moving picture display control unit 93 according to the operation by the user, it is judged that the upper button 52 or the previous button 56 was operated.

When it is judged that the upper button 52 or the previous button 56 was operated in Step S82, the moving picture display control unit 93 judges whether the moving picture during playback is a photo-moving picture or not in Step S83. For example, when slide show information is supplied from the still picture display control unit 92 to the moving picture display control unit 93, and the supplied slide show information includes information indicating that the picture is displayed in the slide show manner, it is judged that the picture is the photo-moving picture.

When it is judged that the picture is not the photo-moving picture in Step S83, the moving picture display control unit 93 performs processing according to the operation by the user in Step S84, and the process proceeds to Step S94. For example, when the control signal indicating that the upper button 52 was operated is supplied from the light receiving unit 22 to the moving picture display control unit 93, the moving picture display control unit 93 controls playback of the moving picture so that a playback position of the moving picture during playback is moved to a position 30 seconds after the playback position at present based on the supplied control signal.

For example, when the control signal indicating that the previous button 56 was operated is supplied from the light receiving unit 22 to the moving picture display control unit 93, the moving picture display control unit 93 controls playback of the moving picture so that a playback position of the moving picture during playback is moved to a position of the top of a chapter which is previous for one chapter to a chapter of the moving picture during playback based on the supplied control signal.

On the other hand, when the moving picture during playback is a photo-moving picture in Step S83, the moving picture display control unit 93 starts playback of a photo-moving picture indicated by a display item which is previous for one display item to the display item indicating the photo-moving picture which is played back at present in display items in the display list generated by the list generation unit 91 based on the control signal supplied from the light receiving unit 22 in Step S85.

That is, the moving picture display control unit 93 acquires a photo-moving picture shown by the display item which is previous for one display item to the display item indicating the playing photo-moving picture from the recording unit 81 and supplies the picture to the display unit 21 to display the photo-moving picture on the display item 21, then, the process proceeds to Step S94.

In more detail, when there is not a display item which is previous for one display item in the display list, namely, when the photo-moving picture shown by the first display item in the display list is played back, playback of the photo-moving picture which is played back at present is continuously performed.

When the display item which is previous for one display item in the display list is a display item indicating a still picture, not a photo-moving picture, the sill picture is played back by the still picture display control unit 92, therefore, the moving picture display control unit 93 does not play back a new photo-moving picture and the process proceeds to Step S94, where the playback of the photo-moving picture during playback is stopped and the still picture is played back by the still picture display control unit 92.

When it is judged that the upper button 52 or the previous button 56 was not operated in Step S82, the moving picture display control unit 93 judges whether the lower button 53 or the next button 57 was operated or not in Step S86. For example, when the user operated the lower button 53 or the next button 57 of the remote commander 12 and a control signal indicating that the lower button 53 was operated or a control signal indicating that the next button 57 was operated is supplied from the light receiving unit 22 to the moving picture display control unit 93 according to the operation of the user, it is judged that the lower button 53 or the next button 57 was operated.

When it is judged that the lower button 53 or the next button 57 was operated in Step S86, the moving picture display control unit 93 judges whether the moving picture during playback is a photo-moving picture or not in Step S87.

When the picture is not a photo-moving picture in Step S87, the moving picture display control unit 93 performs processing according to the operation of the user in Step S88 and the process proceeds to Step S94. For example, the control signal indicating that the lower button 53 was operated is supplied from the light receiving unit 22 to the moving picture display control unit 93, the moving picture display control unit 93 controls playback of the moving picture so that a playback position of the moving picture during playback is moved to a position 15 seconds before the playback position at present based on the supplied control signal.

Also, for example, when the control signal indicating that the next button 57 was operated is supplied from the light receiving unit 22 to the moving picture display control unit 93, the moving picture display control unit 93 controls playback of the moving picture so that a playback position of the moving picture during playback is moved to a position of the top of a chapter which is next for one chapter to a chapter of the moving picture during playback based on the supplied control signal.

On the other hand, when it is judged that the moving picture during playback is a photo-moving picture in Step S87, the moving picture display control unit 93 starts playback of a photo-moving picture indicated by a display item which is next for one display item to the display item indicating the photo-moving picture which is played back at present in display items in the display list generated by the list generation unit 91 based on the control signal supplied from the light receiving unit 22 in Step S89.

That is, the moving picture display control unit 93 acquires a photo-moving picture indicated by the display item which is next for one display item to the display item indicating the playing photo-moving picture from the recording unit 81 and supplies the picture to the display unit 21 to display the photo-moving picture on the display item 21, then, the process proceeds to Step S94.

In more detail, when there is not a next display item in the display list, namely, when the photo-moving picture shown by the last display item in the display list is played back, playback of the photo-moving picture which is played back at present is continuously performed.

When the next display item in the display list is a display item indicating a still picture, not a photo-moving picture, the still picture is played back by the still picture display control unit 92, therefore, the moving picture display control unit 93 does not play back a new photo-moving picture and the process proceeds to Step S94, where the playback of the photo-moving picture during playback is stopped and the still picture is played back by the still picture display control unit 92.

Furthermore, in Step S86, when it is judged that the lower button 53 or the next button 57 was not operated, the moving picture display control unit 93 judges whether the right button 55 was operated or not in Step S90. For example, when the user operated the right button 55 of the remote commander 12 and a control signal indicating that the right button 55 was operated is supplied from the light receiving unit 22 to the moving picture display control unit 93 according to the operation by the user, it is judged that the right-button was operated.

When it is judged that the right button 55 was operated in Step S90, the moving picture display control unit 93 controls the display unit 21 to perform fast-forward playback of the moving picture during playback. That is, the moving picture display control unit 93 controls playback of the moving picture so that the moving picture during playback (a video-moving picture or a photo-moving picture) is played back in a fast forwarding manner and the process proceeds to Step S94.

On the other hand, when it is judged that the right button 55 was not operated, the moving picture display control unit 93 judges whether the left button 54 was operated or not. For example, when the user operated the left button 54 of the remote commander 12 and a control signal indicating that the left button 54 was operated is supplied from the light receiving unit 22 to the moving picture display control unit 93 according to the operation by the user, it is judged that the left button 54 was operated.

When it is judged that the left button 54 was operated in Step S92, the moving picture display control unit 93 controls the display unit 21 to perform fast-rewinding playback of the moving picture during playback. That is, the moving picture display control unit 93 controls playback of the moving picture during playback so that the moving picture during playback is played back in a fast rewinding manner and the process proceeds to Step S94.

When it is judged that the left button 54 was not operated in Step S92, the process proceeds to Step S94.

When the playback control of the moving picture is performed in Step S84, Step S85, Step S88, Step S89, Step S91 or Step S93 or when it is judged that the left button 54 was not operated in Step S92, the moving picture display control unit 93 judges whether playback of the moving picture will be, ended or not in Step S94.

For example, when the played moving picture was played back until the end, namely, when playback of the moving picture ended, when the user operated the remote commander 12 to instruct the end of playback of the moving picture, when the upper button 52 or the previous button 56 was operated by the user during playback of the photo-moving picture and the display item which is previous for one display item to the display item indicating the photo-moving picture during playback indicates the still picture, or when the lower button 53 or the next button 57 was operated by the user during playback of the photo-moving picture and the display item next to the display item indicating the photo-moving picture during playback indicates the still picture, it is judged that playback of the moving picture will be ended.

When it is judged that playback of the moving picture will not be ended in Step S94, the playback of the moving picture is continuously performed, and the process returns to Step S82, where the above processes will be repeated.

On the other hand, when it is judged that playback of the moving picture will be ended in Step S94, the moving picture display control unit 93 judges whether the moving picture whose playback will be ended is a photo-moving picture or not in Step S95. For example, when the slide show information supplied from the still picture display control unit 92 to the moving picture display control unit 93 includes information indicating that the moving picture is played back in the slide show manner, it is judged that the picture is a photo-moving picture.

When it is judged that the moving picture is not a photo-moving picture in Step S95, the moving picture display control unit 93 ends the playback of the moving picture, and the moving picture playback processing ends. In more detail, the moving picture display control unit 93 temporarily stops the playback of the video-moving picture in a state in which the picture of the last frame of the moving picture (video-moving picture) whose playback has ended is displayed on the display unit 21.

On the other hand, when it is judged that the picture is the photo-moving picture in Step S95, the moving picture display control unit 93 judges whether a photo-moving picture of a next display item in the display list will be played back or not in Step S96.

For example, when the end of playback of the photo-moving picture has not been instructed by the user and a display item next to the display item indicating the photo-moving picture whose playback will be ended in the display list is a display item indicating the photo-moving picture, it is judged that a photo-moving picture of a next display item will be played back.

For example, when the photo-moving picture was played back until the end and a display item next to the display item indicating the photo-moving picture whose playback will be ended in the display list is a display item indicating a still picture, when the remote commander 12 was operated by the user and the end of playback of the photo-moving picture was instructed, when the upper button 52 or the previous button 56 was operated and a display item which is previous for one display item to the display item indicating the photo-moving picture whose playback will be ended in the display list, or when the lower button 53 or the next button 57 was operated and a display item next to the display item indicating the photo-moving picture whose playback will be ended in the display list indicates a still picture, it is judged that the photo-moving picture of the next display item will not be played back.

When it is judged that the photo-moving picture of the next display item will be played back in Step S96, the moving picture display control unit 93 ends the playback of the photo-moving picture which was playing back, and the process returns to Step S81, where playback of the photo-moving picture indicated by the next display item is started.

On the other hand, when it is judged that the photo-moving picture of the next display item will not be played back in Step S96, the moving display control unit 93 ends the playback of the photo-moving picture which was playing back, and the process proceeds to Step S97.

In Step S97, the moving picture display control unit 93 generates slide show information. Then, the moving picture display control unit 93 supplies the generated slide show information to the still picture display control unit 92, and the moving picture playback process ends.

For example, the moving picture display control unit 93 generates slide show information including delivery source information indicating the moving picture display control unit 93 as the delivery source for the slide show information, information indicating that the display is performed in the slide show manner, display item information indicating a display item to be played back next as the display item to be played back, namely, indicating a display item next to the display item indicating the photo-moving picture whose playback has been ended in the display list and input switching information indicating setting concerning pictures to be inputted.

When the end of playback of the photo-moving picture is instructed, that is, when the end of the slide show display is instructed by the user, the moving picture display control unit 93 generates the slide show information including information indicating that the end of the slide show display was instructed.

Accordingly, the display device 11 plays back the moving picture, and when the remote commander 12 is operated by the user during playback of the moving picture, the display device 11 performs different playback controls according to whether the moving picture during playback is a photo-moving picture or not if necessary.

For example, when the upper button 52, the lower button 53, the previous button 56 or the next button 57 is operated by the user during playback of a photo-moving picture, namely, during the slide show display, the same playback control as the playback of the still picture is performed, thereby allowing still pictures and photo-moving pictures to be dealt with by the same operation system, which enables control of playback suitable for the slide show display.

According to the above, even when there are both still pictures and photo-moving pictures as pictures to be displayed in the slide show manner, the user can instruct playback controls simply. For example, the user can instruct playback of a picture next to, or previous to the photo-moving picture during playback easily even while the photo-moving picture is played back.

In the above description, the display list of still pictures and moving pictures to be displayed in the slide show manner is generated and the slide show display of pictures is performed based on the display list, however, it is also preferable that the slide show display is performed without generating the display list.

In such case, the list generation unit 91 selects, for example, a picture whose taken date is the oldest in still pictures and moving pictures not selected yet, which are stored in the folder designated by the user, and when the selected picture is a still picture, instructs the still picture display control unit 92 to play back the still picture, then, the still picture display control unit 92 plays back the still picture in accordance with the instruction of the list generation unit 91. When the selected picture is not a moving picture compliant with the previously prescribed standard, the list generation unit 91 selects a next picture without playing back the moving picture, and when the selected picture is a moving picture compliant with the previously prescribed standard, the list generation unit 91 instructs the moving picture display control unit 93 to play back the moving picture. The moving picture display control unit 93 plays back the moving picture in accordance with the instruction of the list generation unit 91.

When the playback of the still picture or the moving picture is ended, the list generation unit 91 selects the next picture and instructs the still picture display control unit 92 or the moving picture display control unit 93 to play back a still picture or a moving picture, then, processing of playing back the picture will be repeated until all pictures stored in the folder are selected.

The display device 11 is not limited to the television receiver but can be other devices, for example, imaging apparatuses such as a digital still camera and a digital video camera, a cellular phone, a personal computer and the like.

The above series of processing can be executed by hardware as well as software. In the case that the series of processing is executed by software, programs included in software are installed from program recording media to a computer incorporated in dedicated hardware or, for example, a general-purpose personal computer which can execute various functions by installing various programs.

FIG. 8 is a block diagram showing a configuration example of a personal computer executing the above series of processing by programs. A CPU (Central Processing Unit) 301 executes various processing in accordance with programs recorded in a ROM (Read Only Memory) 302 or a recording unit 308. In a RAM 303 (Random Access Memory) 303, programs or data executed by the CPU 301 are stored appropriately. The CPU 301, the ROM 302, and the RAM 303 are connected to one another through a bus 304.

An input and output interface 305 is connected to the CPU 301 through the bus 304. To the input and output interface 305, an input unit 306 including a keyboard, a mouse, a microphone and the like, an output unit 307 including a display, a speaker and the like are connected. The CPU 301 executes various processing according to instructions inputted from the input unit 306. Then, the CPU 301 outputs results of processing to the output unit 307.

The recording unit 308 connected to the input and output interface 305 includes, for example, hard disc, storing programs executed by the CPU 301 and various data. A communication unit 309 performs communication with external apparatuses through-networks such as Internet or local area networks.

It is also preferable to acquire programs through the communication unit 309 and record them in the recording unit 308.

A drive 310 connected to the input and output interface 305 drives removal media 331 such as a magnetic disc, an optical disc, a magneto optical disc, or a semiconductor memory when they are mounted, acquiring programs, data and so on recorded therein. The acquired programs and data are transferred to the recording unit 308 if necessary and recorded therein.

The program recording media installed in a computer and allowed to be in an executable state by the computer includes the removable media 331 as packaged media such as a magnetic disc (including a flexible disc), an optical disc (including CD-ROM (Compact Disc-Read Only Memory), DVD (Digital Versatile Disc), a magneto-optical disc or a semiconductor memory, the ROM 302 in which programs are stored temporarily or permanently or hard disc included in the recording unit 308. The storage of programs to the program recording media is performed by using wired or wireless communication media such as local are a networks, Internet and digital satellite broadcasting through the communication unit 309 which is the interface such as a router or a modem, as necessary.

In the specification, steps describing programs to be stored in the program recording media includes not only processing performed along the described order in time series but also processing executed in parallel or individually even when not always processed in time series.

The embodiments of the invention are not limited to the above embodiment, and can be modified variously in a scope not departing from the gist of the invention.

What is claimed is:

1. A display device including a playback control device comprising:
   a list generation unit references respective still pictures and moving pictures stored in a folder, designated by a user, as contents to be displayed in a slide show manner and generates a display list in which display items, as information, indicating the contents are arranged in a prescribed order;
   a selection unit selects (a) a moving picture of a moving picture file having at least one of (1) a file name satisfying prescribed standards for an imaging apparatus and (2) a prescribed file format, and (b) a still picture among still pictures and moving pictures stored in a recording unit which also stores moving pictures which do not satisfy the prescribed standards and prescribed file format; and
   a hardware implemented playback control unit controls playback of the selected still pictures and controls playback of the moving pictures so that still pictures and the moving pictures, selected by the selection unit, are played back sequentially in the prescribed order in the slide show manner, the playback control unit controls playback of the moving picture during playback so that playback of a still picture or a moving picture, which is previous or next to the moving picture during playback in the prescribed order is started when a given operation was performed by the user to an input means.

2. The display device including the playback control device according to claim 1,
   wherein the selection unit selects the moving picture of the moving picture file which is compliant with a previously prescribed standard based on the file name and the file format.

3. The display device including the playback control device according to claim 1,
   wherein the input means operated when instructing playback control of the still picture and the moving picture during play back of the moving picture selected by the selection unit.

4. The display device including the playback control device according to claim 3,
   wherein control, which is different from playback control performed according to the given operation during playback of the moving picture selected by the selection unit in the slide show manner, is performed in the case that the given operation is performed when only one moving picture designated by the user is played back.

5. The display device including playback control device according to claim 3,
wherein the playback control unit controls playback of the still picture during playback so that playback of a still picture or a moving picture which is previous or next to the still picture during playback in the prescribed order in the slide show manner is started when the given operation was performed during playback of the still picture selected by the selection unit.

6. The display device including playback control device according to claim 1,
wherein the playback control unit controls playback of the still picture and the moving picture so that a next still picture or moving picture selected by the selection unit is played back when playback of one moving picture selected by the selection unit ended.

7. A playback control method of a playback control device comprising the steps of:
referencing respective still pictures and moving pictures stored in a folder, designated by a user, as contents to be displayed in a slide show manner and generating a display list in which display items, as information, indicating the contents are arranged in a prescribed order;
selecting, by a selection means (a) a moving picture of a moving picture file having at least one of (1) a file name satisfying prescribed standards of an imaging apparatus and (2) a prescribed file format and (b) a still picture among still pictures and moving pictures stored on a recording unit which also stores moving pictures which do not satisfy the prescribed standards and prescribed file format; and
controlling playback of the still pictures and controlling playback of the moving pictures so that still pictures and the moving pictures, selected by the selection means, are played back sequentially in the prescribed order in the slide show manner, and controlling playback of the moving picture during playback so that playback of a still picture or a moving picture, which is previous or next to the moving picture during playback in the prescribed order is started when a given operation was performed by the user to an input means.

8. A program embodied on a non-transitory computer readable medium allowing a computer to execute processing including the steps of:
referencing respective still pictures and moving pictures stored in a folder, designated by a user, as contents to be displayed in a slide show manner and generating a display list in which display items, as information, indicating the contents are arranged in a prescribed order;
selecting, by a selection means, (a) a moving picture of a moving picture file having at least one of (1) a file name satisfying prescribed standards for an imaging apparatus and (2) a prescribed file format and (b) a still picture among still pictures and moving pictures stored on a recording unit which also stores moving pictures which do not satisfy the prescribed standards and prescribed file format; and
controlling playback of the still pictures and controlling playback of the moving pictures so that still pictures and the moving pictures, selected by the selection means, are played back sequentially in the prescribed order in the slide show manner, and controlling playback of the moving picture during playback so that playback of a still picture or a moving picture, which is previous or next to the moving picture during playback in the prescribed order is started when a given operation was performed by the user to an input means.

9. A display device including a playback control device comprising:
a list generation unit references respective still pictures and moving pictures stored in a folder, designated by a user, as contents to be displayed in a slide show manner and generates a display list in which display items, as information, indicating the contents are arranged in a prescribed order;
a selection unit selects (a) a moving picture of a moving picture file having at least one of (1) a file name satisfying prescribed standards for an imaging apparatus and (2) a prescribed file format, and (b) a still picture among still pictures and moving pictures recorded on a recording unit which also stores moving pictures which do not satisfy the prescribed standards and prescribed file format, and
a hardware implemented playback control unit controls playback of the still pictures and controls playback of the moving pictures so that still pictures and the moving pictures, selected by the selection unit, are played back sequentially in the prescribed order in the slide show manner, the playback control unit controls playback of the moving picture during playback so that playback of a still picture or a moving picture, which is previous or next to the moving picture during playback in the prescribed order is started when a given operation was performed by the user to an input means.

* * * * *